United States Patent
Ahn

(10) Patent No.: US 7,880,988 B2
(45) Date of Patent: Feb. 1, 2011

(54) HARD DISK DRIVE AND ASSOCIATED METHOD FOR OPTIMIZING WRITE PARAMETERS

(75) Inventor: Hyo June Ahn, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 366 days.

(21) Appl. No.: 12/031,922

(22) Filed: Feb. 15, 2008

(65) Prior Publication Data
US 2008/0198492 A1 Aug. 21, 2008

(30) Foreign Application Priority Data
Feb. 16, 2007 (KR) ............... 10-2007-0016486

(51) Int. Cl.
*G11B 27/36* (2006.01)
(52) U.S. Cl. ............................. 360/31
(58) Field of Classification Search .......... 360/31, 360/53, 75
See application file for complete search history.

(56) References Cited

U.S. PATENT DOCUMENTS

| | | | | |
|---|---|---|---|---|
| 6,005,731 | A * | 12/1999 | Foland et al. | 360/53 |
| 6,529,457 | B1 * | 3/2003 | Narumi et al. | 369/47.53 |
| 6,696,832 | B2 * | 2/2004 | Chew et al. | 324/210 |
| 6,839,193 | B2 * | 1/2005 | Chong et al. | 360/31 |
| 6,975,468 | B1 * | 12/2005 | Melrose et al. | 360/31 |
| 7,088,656 | B2 * | 8/2006 | Narumi et al. | 369/47.53 |
| 7,110,197 | B2 * | 9/2006 | Cho | 360/31 |
| 7,212,361 | B1 * | 5/2007 | Pederson et al. | 360/31 |
| 7,489,461 | B2 * | 2/2009 | Yun et al. | 360/31 |
| 2005/0180267 | A1 * | 8/2005 | Jeong et al. | 368/96 |
| 2009/0010643 | A1 * | 1/2009 | DeLew et al. | 398/17 |

FOREIGN PATENT DOCUMENTS

| | | |
|---|---|---|
| JP | 08315529 A | 11/1996 |
| KR | 20010013729 A | 2/2001 |
| KR | 1020020065356 A | 8/2002 |
| KR | 1020040052030 A | 6/2004 |
| KR | 1020050028388 A | 3/2005 |

* cited by examiner

*Primary Examiner*—Fred Tzeng
(74) *Attorney, Agent, or Firm*—Volentine & Whitt, PLLC

(57) ABSTRACT

A hard disk drive which can maintain a write property at a constant level by reflecting a temperature effect during a write parameter set process even when the hard disk drive is used under a condition different from one intended during manufacturing of the disk. The hard disk drive includes a disk, a thermister and a controller. The disk stores data and the thermister measures the temperature around the disk. The controller is coupled to the thermister and selects a parameter to be optimized from parameters related to a disk write operation. The controller writes arbitrary data to a test track on the disk to obtain a first bit error rate of the test track. The controller repeatedly writes arbitrary data to at least one track adjacent to the test track indicated by as many times as an adjacent track write count is based on an associated temperature measured by the thermister to obtain a second bit error rate of the test track. The controller sets a value of the selected parameter to determine a difference between the first bit error rate and the second bit error rate which is less than a predetermined criteria corresponding to an optimized value of the selected parameter in a disk zone to which the test track is located.

14 Claims, 5 Drawing Sheets

HARD DISK DRIVE AND ASSOCIATED METHOD FOR OPTIMIZING WRITE PARAMETERS

CROSS-REFERENCE TO RELATED PATENT APPLICATION

This application claims the benefit of Korean Patent Application No. 10-2007-0016486 filed on 16 Feb. 2007 in the Korean Intellectual Property Office, the disclosure of which is incorporated herein in its entirety by reference.

BACKGROUND OF THE INVENTION

1. Field of the Invention

Embodiments of the invention relate to a hard disk drive. More particularly, embodiments of the invention relate to a hard disk drive that maintains a write property at a constant level even when the hard disk drive is used under a condition different from one intended by the manufacturer and an associated method for optimizing write parameters of a hard disk drive.

2. Discussion of Related Art

Hard disk drives (HDDs) are memory devices that record and reproduce data by converting digital electric pulses into a magnetic field. HDDs are widely used as auxiliary memory devices for computer systems to accommodate fast access time to a large amount of data. A HDD writes and reads data using a magnetic head. Typically, the magnetic head includes a write head for writing data and a read head for reading data. When the write head is located at a target track of the disk to form a magnetic field, the target track is magnetized so that data is written to a corresponding track. The read head reads the data by detecting the magnetic field of the track where the data is written. The data can be smoothly recorded when the write head magnetizes the target track with a magnetic field having an appropriate strength. However, when the strength of the magnetic field formed by the write head is too small (i.e. weak write), data recording at the target track fails. When the strength of a magnetic field formed by the write head is too large (referred to as adjacent track erasure (ATE)), data that is already recorded on other tracks adjacent to the target track is erased.

The strength of the magnetic field formed by the write head is determined by the current supplied to the write head. FIG. 1 shows a typical waveform of such a current. As time passes, the current supplied to the write head characteristically increases to the maximum, drops to a certain value and maintains a constant value. The current maintained at the constant value as time passes is referred to as a write current (WC). Also, current in excess of the WC just before the WC is supplied to the write head is referred to as an "overshoot". The time for maintaining the overshoot is referred to as the "overshoot duration" (OSD). The difference between the maximum of the overshoot and the WC is referred to as "overshoot amplitude" (OSA).

The WC, OSD, and OSA parameters determine the strength of a magnetic field of the write head. A method for finding the most appropriate values of these parameters in the manufacturing process of a hard disk drive is described below. For example, in a method for finding the optimal WC, the Nth track on a disk is selected to record data. After recording the data, a bit error rate (BER) is measured. Then, data is recorded at adjacent tracks, ((N+1)th and (N−1)th tracks) a predetermined number of times and the BER of the Nth track is measured. These steps are repeated by changing the WC value. When the difference in the BER before and after the measurement is not greater than a predetermined criteria or value, the optimal WC is set.

The write characteristic of the write head also varies according to the temperature condition of the hard disk drive. That is, when the temperature of the hard disk drive is different even if other parameters (e.g. WC, OSD, and OSA) are the same, the write characteristic of the write head can be changed. When write parameters are selected in a method which does not consider the temperature condition of the hard disk drive and the temperature condition of the hard disk drive is changed, the selected write parameters are difficult to maintain at a level to accommodate the characteristics associated with the write head.

SUMMARY OF THE INVENTION

Exemplary embodiments of the present invention are directed to a hard disk drive which can maintain a write property at a constant level by reflecting the temperature effect during a write parameter set process even when the hard disk drive is used under a condition different from one intended during manufacture of the disk. In an exemplary embodiment, the method for optimizing write parameters of a hard disk drive includes selecting a parameter to be optimized from parameters related to a disk write operation and setting a value with respect to the selected parameter. Arbitrary data is written to a test track on the disk to obtain a first bit error rate associated with the test track. The arbitrary data is repeatedly written to at least one track adjacent to the test track based on an adjacent track write count according to a temperature around the disk to obtain a second bit error rate of the test track. The first bit error rate is compared with the second bit error rate. A value of the selected parameter is set such that the difference between the first bit error rate and the second bit error rate is less than a predetermined criteria corresponding to an optimized value of the selected parameter in a disk zone to which the test track is located.

DESCRIPTION OF EMBODIMENTS

Figure 1:
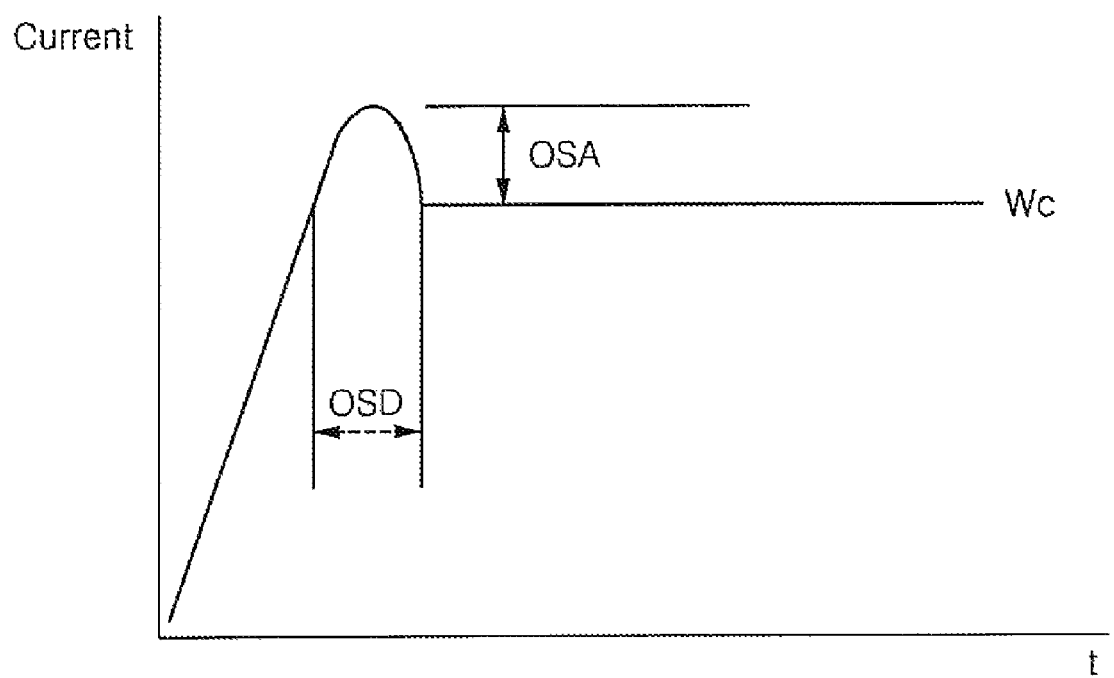
FIG. 1 illustrates a typical waveform of current supplied to a magnetic head of a hard disk drive.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 2:
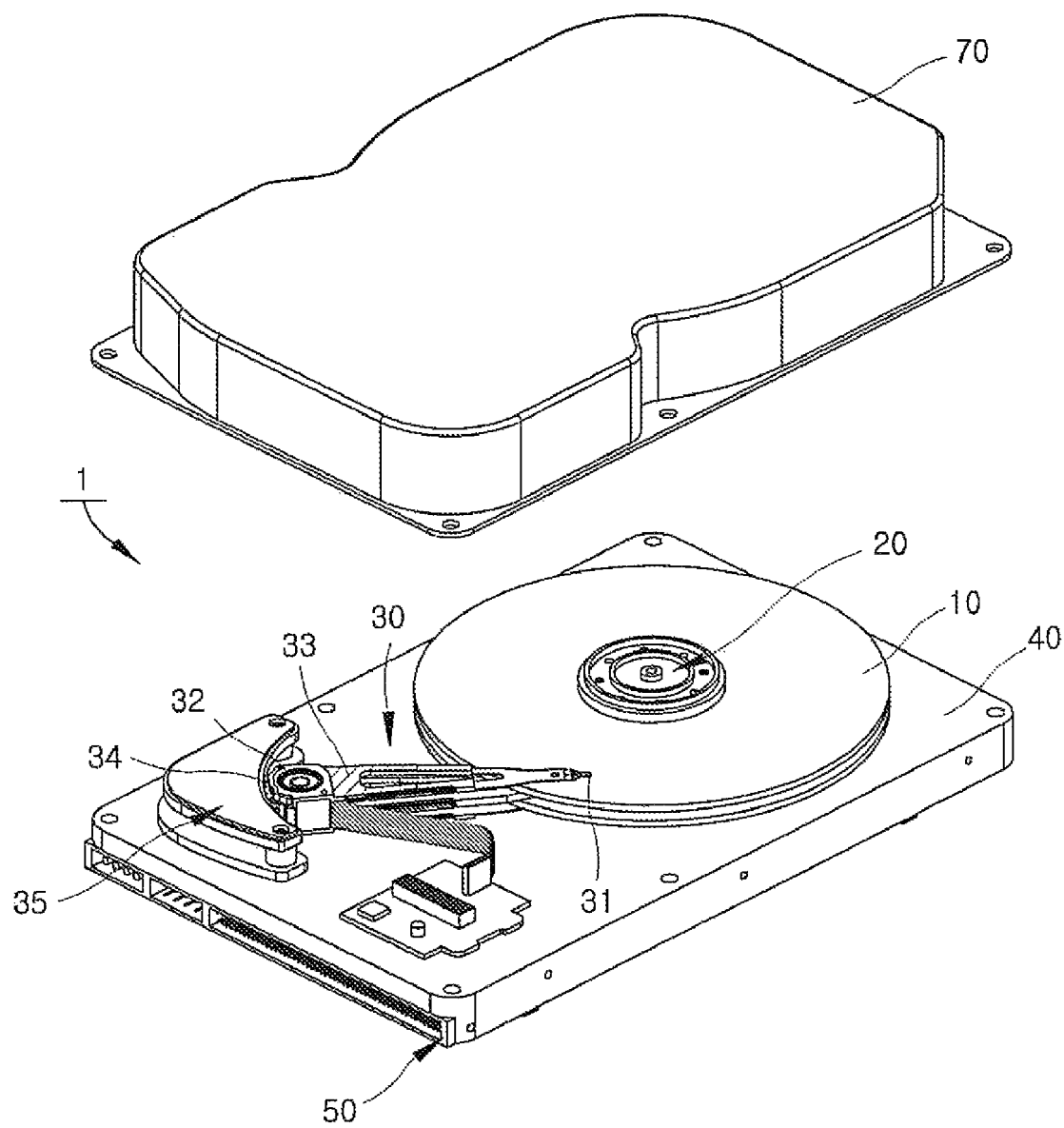
FIG. 2 is an exploded perspective view of a hard disk drive according to an embodiment of the present invention.

FIG. 2 is an exploded perspective view of a hard disk drive according to an embodiment of the present invention and FIG.

3 is a block diagram of a drive circuit of the hard disk drive shown in FIG. 2. Hard disk drive 1 includes disk 10 configured to record and store data, spindle motor 20 which supports and rotates disk 10, and head stack assembly (HSA) 30 which reads the data from disk 10. Base 40 supports printed circuit board assembly (PCBA) 50 coupled to a lower portion of base 40 which also includes a PCB (not shown) on which most circuit parts are mounted. A thermister 60 outputs the internal temperature of hard disk drive 1 and cover 70 protects the top portion of base 40.

Disk 10 is sectioned into a plurality of tracks which are concentric around the center of disk 10. Each track is sectioned into a plurality of sectors. A typical operation of recording or reading data to/from the hard disk drive 1 is performed in units of sectors. Each sector is typically assigned with a storage space of 512 Bytes. Spindle motor 20 rotates disk 10 in response to a control signal from controller 80. The rotational speed of spindle motor 20 may be, for example, 3,600 rpm, 5,400 rpm, 7,200 rpm, and 10,000 rpm.

HSA 30 is a carriage that records data onto disk 10 or reads recorded data from disk 10. HSA 30 includes a magnetic head 31 for recording or reading data, an actuator arm 33 having magnetic head 31 which moves across disk 10 around pivot shaft 32. Actuator arm 33 is coupled to and supported by pivot shaft holder 34. Voice coil motor (VCM) 35 located at the opposite side of the actuator arm 33 with respect to the pivot shaft 32 drives actuator arm 33. Magnetic head 31 includes a read head (not shown) and a write head (not shown). The read head detects a magnetic field from disk 10 and reads data. The write head magnetizes disk 10 by receiving current in a particular waveform from pre-amplifier (Pre-AMP) 81 to form a magnetic field on disk 10. As described above, the write current (WC), overshoot duration (OSD), and overshoot amplitude (OSA) are the major parameters related to the current supplied to the write head. Since the strength of the magnetic filed formed by the write head is determined by these three parameters, these parameters must be set to appropriate values before hard disk drive 1 is used. When the parameters are set to inappropriate values, a weak write due to a weak magnetic field may occur or an adjacent track erasure (ATE) due to a strong magnetic field may be generated.

Magnetic head 31 is mounted on actuator arm 33 at one end and the other end is rotatably coupled to pivot shaft 32. Actuator arm 33 extends so that magnetic head 31 can move freely over the surface of disk 10 within a predetermined angular range. Pivot shaft holder 34 rotatably supports pivot shaft 32 and simultaneously supports actuator arm 33 which is coupled to pivot shaft holder 34.

VCM 35 rotates actuator arm 33 around pivot shaft 32 and includes a voice coil (not shown) and a magnet (not shown). When an electromagnetic force is generated by the interaction between lines of a magnetic force generated by the magnet and current flowing in the voice coil, actuator arm 33 rotates from the electromagnetic force in a direction according to Fleming's left hand rule. Although in the present embodiment VCM 35 drives actuator arm 33, a stepper motor may replace VCM 35 to rotate actuator arm 33 by a predetermined angle according to an input signal. However, VCM 35 is preferred because of its heat resistance, superior reliability and obviates the need for periodic formatting. Thermister 60 electrically connects HSA 30 located on the upper and lower surface of base 40. Thermister 60 measures the internal temperature of hard disk drive 1 and outputs the measured temperature to controller 80.

Figure 3:
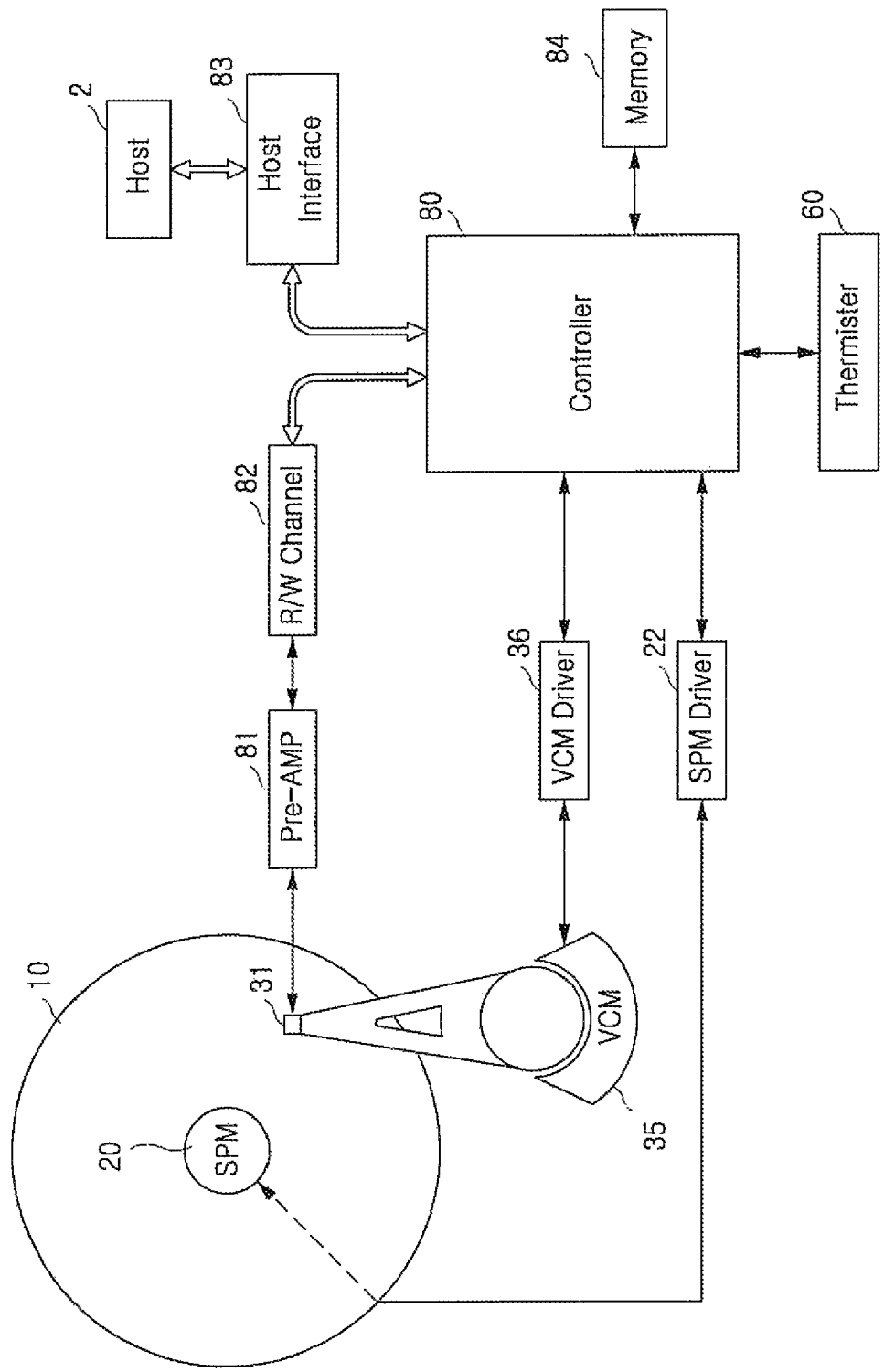
FIG. 3 is a block diagram of a drive circuit of the hard disk drive of FIG. 2.

FIG. 3 is a block diagram of a drive circuit of the hard disk drive shown in FIG. 2 which includes Pre-AMP 81, read/write channel (R/W channel) 82, host interface 83, VCM driver 36, spindle motor driver (SPM driver) 22, controller 80, and memory 84. Pre-AMP 81 amplifies a read signal generated as the read head (not shown) detects a magnetic field from disk 10. Pre-AMP 81 outputs the amplified signal to R/W channel 82. Pre-AMP 81 further amplifies the current associated with a particular waveform received from R/W channel 82 and supplies the amplified current to the write head (not shown). R/W channel 82 converts the read signal amplified by Pre-AMP 81 to a digital signal and outputs the converted signal to controller 80. The data from host interface 83 is received by R/W channel 82 via controller 80 and converts the received data to an analog signal for output to Pre-AMP 81.

Host interface 83 transmits the digitalized data to host device 2 in a data read mode. Host interface 83 receives data input by a user from host device 2 and outputs the received data to controller 80 in a data write mode. Host device 2 may collectively represent a computer including hard disk drive 1, a CPU or I/O controller. VCM driver 36 controls the amount of current applied to VCM 35 via controller 80. SPM driver 22 controls the amount of current applied to SPM 20 via controller 80. Controller 80 receives the data input by a user through host device 2 through host interface 83 and outputs the received data to R/W channel 82 in the data write mode. Controller 80 receives the read signal converted to the digital signal by R/W channel 82 and outputs the received signal to host interface 83 in the data read mode. Controller 80 is configured to control the output of VCM driver 36 and SPM driver 22 and receives a signal representing the temperature measured by thermister 60. The controller 80 may be a microprocessor or a microcontroller and can be embodied in form of software or firmware performing a method for optimizing write parameters of a hard disk drive as described below.

Figure 4:
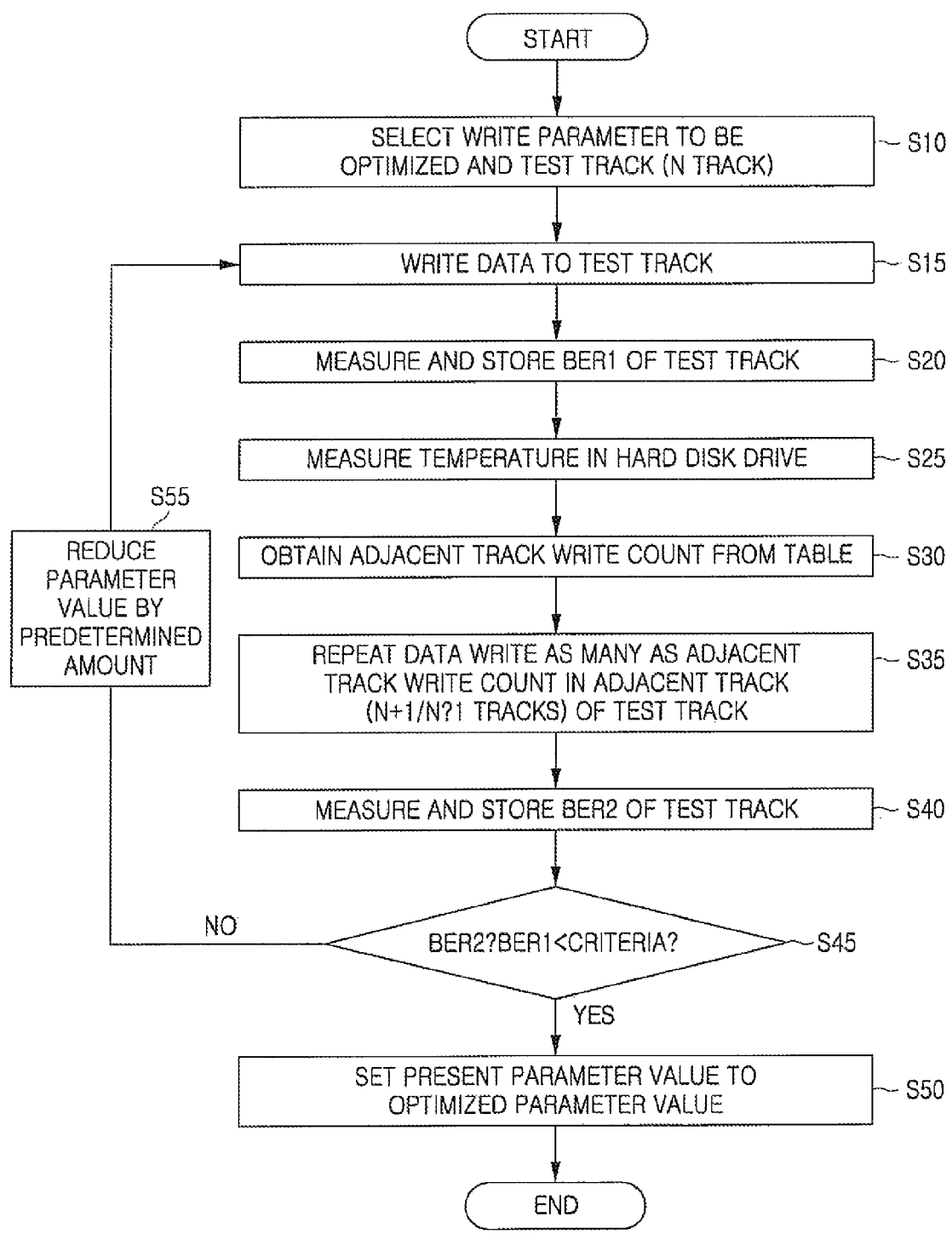
FIG. 4 is a flowchart illustrating a method for optimizing write parameters of the hard disk drive shown in FIG. 2.

FIG. 4 is a flowchart for illustrating a method for optimizing write parameters of the hard disk drive of FIG. 2. First, a parameter to be optimized is selected from parameters related to the write operation on disk 10 and an initial value of the selected parameter is set. At step S10, a test track (Nth track) is selected to perform a test on disk 10. The parameters related to the write operation include write current (WC), overshoot duration (OSD), and overshoot amplitude (OSA) which determine the property of current in a particular waveform supplied from Pre-AMP 81 to the write head. As the values of these parameters increase, the possibility of generating a weak write decreases while the possibility of generating the ATE increases. In the present invention, a case in which the WC is selected as a parameter to be optimized is described in which the test track is referred to as the "Nth" track. At step S15, arbitrary data is written to the selected test track (Nth track). The first bit error rate (BER1) of the test track is measured and stored in the maintenance cylinder of disk 10 or memory 84 at step S20. The BER is a ratio of the number of bits where write errors are generated to the number of the total bits where data can be written to the test track.

Figure 5:
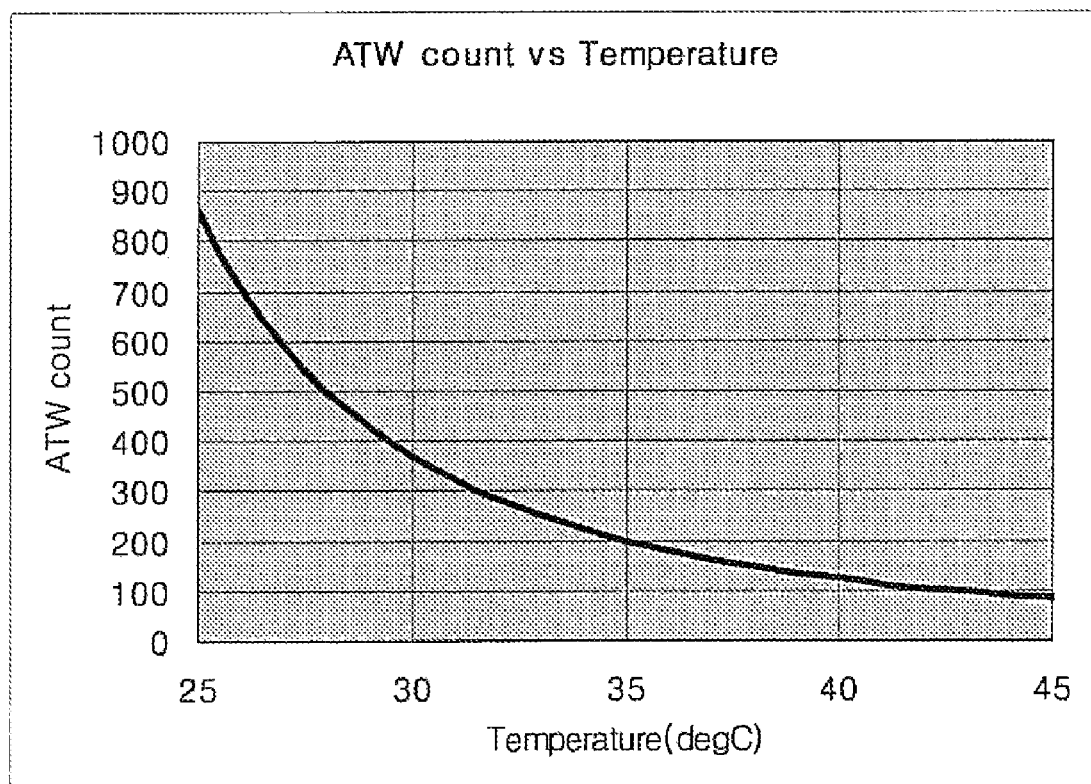
FIG. 5 is a graph indicating the relationship between the adjacent track write count and the temperature in the hard disk drive of FIG. 2.

In step S25, temperature in the hard disk drive 1 is measured using thermister 60 installed on the FPC. An adjacent track write count (ATW count) corresponding to the temperature measured by thermister 60 is obtained from a table at step S30. The ATW count table can be produced from the graph of FIG. 5. Referring briefly to FIG. 5, a track (M track) is selected and data is repeatedly written to M−1/M+1 tracks that are adjacent to the M track by only varying the temperature condition. When the BER of the M track equals a specified parameter or criteria, the number of writing data to the M−1/M+1 tracks is set as the ATW count at a particular temperature. For example, when temperature is 35° C. and data is repeatedly written to the M−1/M+1 tracks about 200 times, the BER of the M track reaches the specified parameter.

When the temperature is 40° C. and data is repeatedly written to the M−1/M+1 tracks about 130 times, the BER of the M track reaches the specified parameter. The data written in the M−1/M+1 tracks to generate the BER to a certain degree in the M track varies according to the temperature of the hard disk drive. Thus, it can be seen that the generation of the ATE when data is written is affected by the disk drive temperature in addition to the parameters related to the current supplied to the write head.

In order to reflect the temperature effect of the hard disk drive during data recording, the ATW count is set according to the temperature. The setting is made by tabulating the ATW counts at different temperatures in the form of, for example, 30° C., 370 times; 35° C., 200 times; and 40° C., 130 times as seen in the graph of FIG. 5. The table is stored in maintenance cylinder of the disk 10 or memory 84.

Referring back to FIG. 4, arbitrary data is repeatedly written as according to the ATW count obtained from the table to two tracks (N−1/N+1 tracks) that are closest to the test track (Nth track) at step S35. As the data is repeatedly written to the N−1/N+1 tracks, the amount of ATE in the Nth track increases. Accordingly, the BER of the Nth track gradually increases. In step S40, the second BER of the test track is measured and stored in the maintenance cylinder of disk 10 or memory 84. The difference between the first BER and the second BER is compared with the predetermined criteria at step S45. When the difference between the first BER and the second BER is less than the predetermined criteria (providing a "YES" result from step S45), the value of the present WC is set to the optimal value in a zone to which the test track belongs at step S50. When the difference between the first BER and the second BER is not less than the predetermined criteria (providing a "NO" result from step S45), the WC is decreased by a predetermined amount at step S55 and the above steps are repeated until the difference between the first BER and the second BER is less than the predetermined criteria. Here, the criteria used as a reference value of the difference between the first and second BERs is selected considering the ATE and the weak write generated when the data is written to disk 10. In this manner, since the effect of the temperature of the hard disk drive is reflected in the process of optimizing the WC, even when the hard disk drive is used in a temperature condition different from the one which intended during manufacturing, the write property of the write head can be maintained at an appropriate level. Thus, the reliability of the optimized WC can be improved. Although the WC was selected as a parameter to be optimized is this embodiment, the present invention can be applied to a case in which the OSD or OSA is selected as the parameter to be optimized.

Accordingly, a hard disk drive can maintain a write property at a constant level by reflecting the effect of temperature during a write parameter set process even when the hard disk drive is used under a condition different from one intended during manufacturing of the drive. A method for optimizing write parameters of a hard disk drive and a computer readable recording media for recording the method are also described.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A method for optimizing write parameters of a hard disk drive, the method comprising:
   selecting a parameter to be optimized from parameters related to a disk write operation;
   setting a value with respect to the selected parameter;
   writing arbitrary data to a test track on the disk to obtain a first bit error rate of the test track;
   repeatedly writing arbitrary data to at least one track adjacent to the test track based on an adjacent track write count a number of times according to a temperature around the disk to obtain a second bit error rate of the test track;
   comparing the first bit error rate with the second bit error rate; and
   setting a value of the selected parameter that makes a difference between the first bit error rate and the second bit error rate less than a predetermined criteria corresponding to an optimized value of the selected parameter in a disk zone to which the test track is located.

2. The method of claim 1 wherein selecting a parameter to be optimized from parameters related to a disk write operation are re-write current, overshoot duration, and overshoot amplitude.

3. The method of claim 1 wherein repeatedly writing arbitrary data to at least one track adjacent to the test track based on an adjacent track write count according to a temperature around the disk to obtain a second bit error rate of the test track further comprises:
   measuring the temperature around the disk;
   obtaining an adjacent track write count corresponding to the measured disk temperature from a table related to the adjacent track write count according to the measured temperature; and
   writing arbitrary data to at least one track adjacent to the test track a number of times according to the adjacent track write count obtained from the table.

4. The method of claim 3 wherein the table related to the adjacent track write count according to temperature tabulates adjacent track write counts corresponding to temperatures.

5. The method of claim 4 wherein the adjacent track write counts is tabulated by setting the adjacent track write count to the number of writes in at least one adjacent track with respect to the track which has a bit error rate of any track on the disk at a corresponding temperature associated with a predetermined criteria.

6. The method of claim 3, wherein at least one track adjacent to the test track is selected from two tracks located on either side of the test track.

7. The method of claim 3, wherein the temperature around the disk is measured using a thermister installed around the disk.

8. The method of claim 1 further comprising obtaining a first bit error rate and a second bit error rate by reducing a certain amount of the selected parameter value when the difference between the first bit error rate and the second bit error rate is greater than the predetermined criteria.

9. A hard disk drive comprising:
   a disk for storing data;
   a thermister for obtaining a temperature around the disk; and
   a controller coupled to said disk and said thermister, said controller configured to select a parameter to be optimized from parameters related to a disk write operation, said controller further configured to write arbitrary data to a test track on the disk to obtain a first bit error rate of the test track, said controller repeatedly writing arbitrary data to at least one track adjacent to the test track as many times as an adjacent track write count that is based on an associated temperature measured by said thermister to obtain a second bit error rate of the test track, the controller setting a value of the selected parameter to determine a difference between the first bit error rate and the second bit error rate which is less than a predetermined criteria corresponding to an optimized value of the selected parameter in a disk zone to which the test track is located.

10. The hard disk drive of claim 9, wherein the controller selects either a write current, overshoot duration, or overshoot amplitude when selecting said parameter to be optimized.

11. The hard disk drive of claim 9, wherein the controller is further configured to obtain an adjacent track write count corresponding to the measured temperature, provided by said thermister, from a table related to the adjacent track write count according to said measured temperature, said controller writing arbitrary data to at least one track adjacent to the test track according to the number of times of the adjacent track write count obtained from the table to obtain the second bit error rate of the test track.

12. The hard disk drive of claim 11, wherein the table tabulates adjacent track write counts corresponding to temperatures by setting the adjacent track write count to the number of writes in at least one adjacent track with respect to the track having a bit error rate at a corresponding temperature reach a predetermined criteria.

13. The hard disk drive of claim 12, wherein said adjacent track is two tracks.

14. The hard disk drive of claim 11, wherein said at least one track adjacent to the test track is two tracks located closest to said test track.

* * * * *